United States Patent
Waiser

(10) Patent No.: US 7,131,434 B2
(45) Date of Patent: Nov. 7, 2006

(54) AUXILIARY VALVE

(76) Inventor: Hector Waiser, Velsen 4428, Apt. 3, Malvin (UY)

( * ) Notice: Subject to any disclaimer, the term of this patent is extended or adjusted under 35 U.S.C. 154(b) by 0 days.

(21) Appl. No.: 10/946,681

(22) Filed: Sep. 22, 2004

(65) Prior Publication Data

US 2005/0098165 A1    May 12, 2005

(51) Int. Cl.
*F02M 23/00* (2006.01)
(52) U.S. Cl. ...................................... 123/587
(58) Field of Classification Search ................ 123/587, 123/586; 137/480, 540
See application file for complete search history.

(56) References Cited

FOREIGN PATENT DOCUMENTS

DE          3317224 A1  *  1/1985
UY          27887          2/2005

\* cited by examiner

*Primary Examiner*—Stephen K. Cronin
*Assistant Examiner*—Hyder Ali
(74) *Attorney, Agent, or Firm*—Evelyn Defilló; Defillo & Associates, Inc

(57) ABSTRACT

An auxiliary valve assembly for improving the aspiration of an internal combustion engine. The auxiliary valve can be thread-mounted to a gas-air intake chamber. A spring-biased ball that seals an air inlet opens under sufficient vacuum pressure. Filtered air then passes through the auxiliary valve assembly into the gas-air intake chamber. The incoming air oxygenates the gas and thus improves fuel economy, extends value and spark plug life, reduces pollution, and improves oil viscosity.

20 Claims, 2 Drawing Sheets

AUXILIARY VALVE

RELATED ART

This application hereby incorporates Uruguay Patent application number 27887, filed on Jul. 9, 2003 by Hector Waiser in its entirety as if fully set out herein.

BACKGROUND OF THE INVENTION

1. Field of the Invention

Embodiments of the present invention generally relate to a vehicle aspiration. In particular, embodiments of the present invention relate to an auxiliary value used during engine aspiration.

2. Description of the Related Art

Internal combustion engines have proven to be very useful propulsion devices in automobiles and trucks. Indeed, modern society depends on internal combustion engines powering such vehicles to provide transportation for people and for goods. However, internal combustion engines are not without serious problems. They cost money to operate, both in direct fuel costs and in required maintenance, and their operation pollutes the environment.

Because of the seriousness of the foregoing problems associated with internal combustion engines it is important to reduce those problems as much as practical. While there are many ways to address those problems, one widely accepted approach is to focus on providing good engine aspiration. Aspiration is important since internal combustion engines require oxygen to combust with fuel to produce power. A good aspiration system can reduce fuel costs, reduce maintenance requirements on engine valves and spark plugs, maintain good oil viscosity, and improve the environment.

Therefore, an apparatus that improves the aspiration of an internal combustion engine would be beneficial. Particularly beneficial would be a low cost, easily used apparatus that improves the aspiration of an internal combustion engine.

SUMMARY OF THE INVENTION

The present invention generally provides for an auxiliary valve assembly that improves the aspiration of an internal combustion engine. The auxiliary valve is beneficially thread-mounted to a gas-air intake chamber. When the vacuum within the gas-air intake chamber increases sufficiently the auxiliary valve opens, allowing increased oxygenation of the gas-air mixture.

BRIEF DESCRIPTION OF THE DRAWINGS

So that the manner in which the above recited features of the present invention can be understood in detail, a more particular description of the invention, briefly summarized above, may be had by reference to an embodiment that is illustrated in the appended drawing. It is to be noted, however, that the appended drawing illustrates only embodiment of this invention and is therefore not to be considered limiting of its scope, for the invention may admit to other equally effective embodiments.

DETAILED DESCRIPTION

The present invention relates to auxiliary valve assemblies that improve the aspiration of internal combustion engines such as those used in motorized vehicles. Such auxiliary valve assemblies are beneficially thread-mounted to a gas-air intake chamber of the internal combustion engines, open at a predetermined vacuum pressure, and include an air intake filter. When opened, the auxiliary valve assembly allows increased oxygenation of a gas-air mixture.

Figure 1:
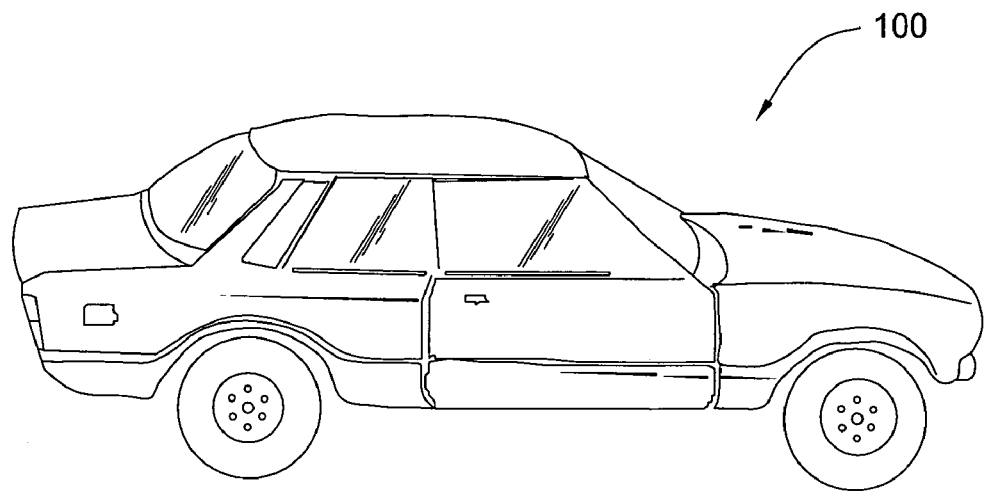
FIG. 1 illustrates a motorized vehicle.
Figure 2:
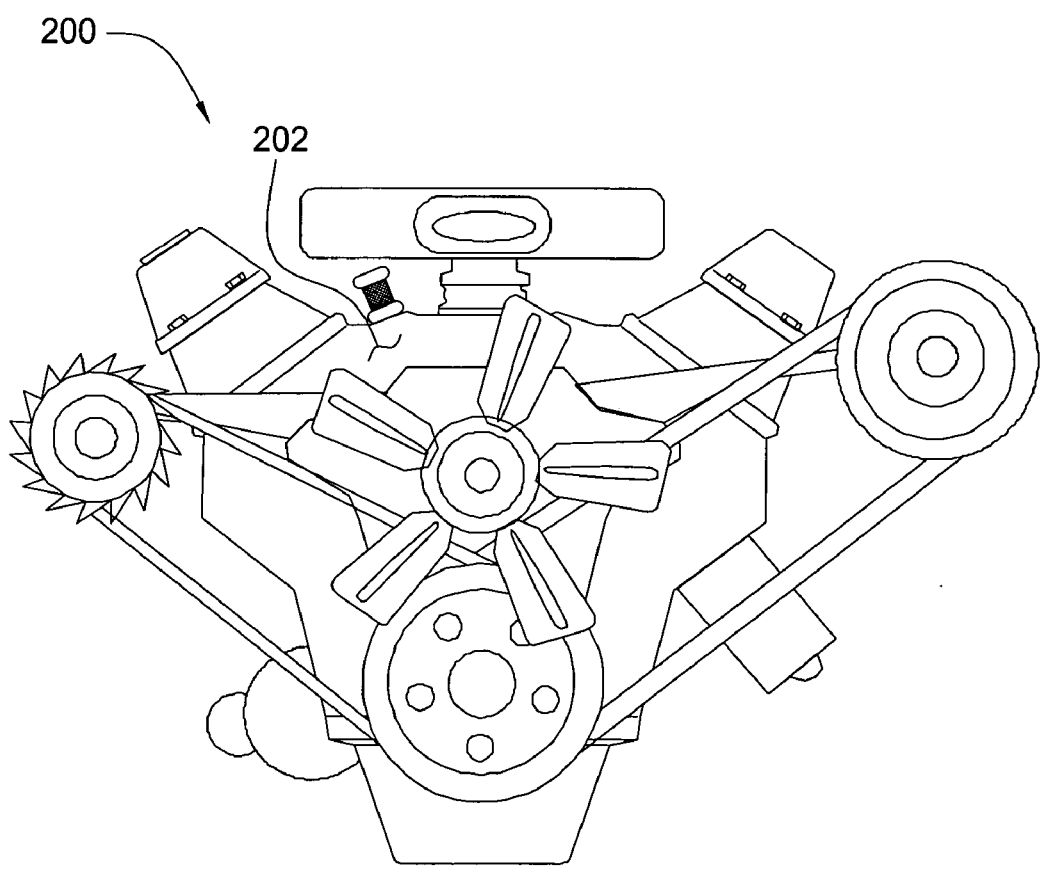
FIG. 2 illustrates an internal combustion engine used in the motorized vehicle of FIG. 1.

FIG. 1 illustrates a motorized vehicle 100, specifically an automobile, which uses an internal combustion engine for propulsion and that incorporates an auxiliary valve assembly that is in accord with the principles of the present invention. FIG. 2 illustrates an internal combustion engine 200 having a gas-air intake chamber 202, commonly known as an air intake manifold. Attached to that gas-air intake chamber 202 is an auxiliary valve assembly 300 that is in accord with the principles of the present invention.

The auxiliary valve assembly 300 improves the aspiration of the internal combustion engine 200, which improves fuel economy, extends value and spark plug life, reduces pollution, and improves oil viscosity.

Figure 3:
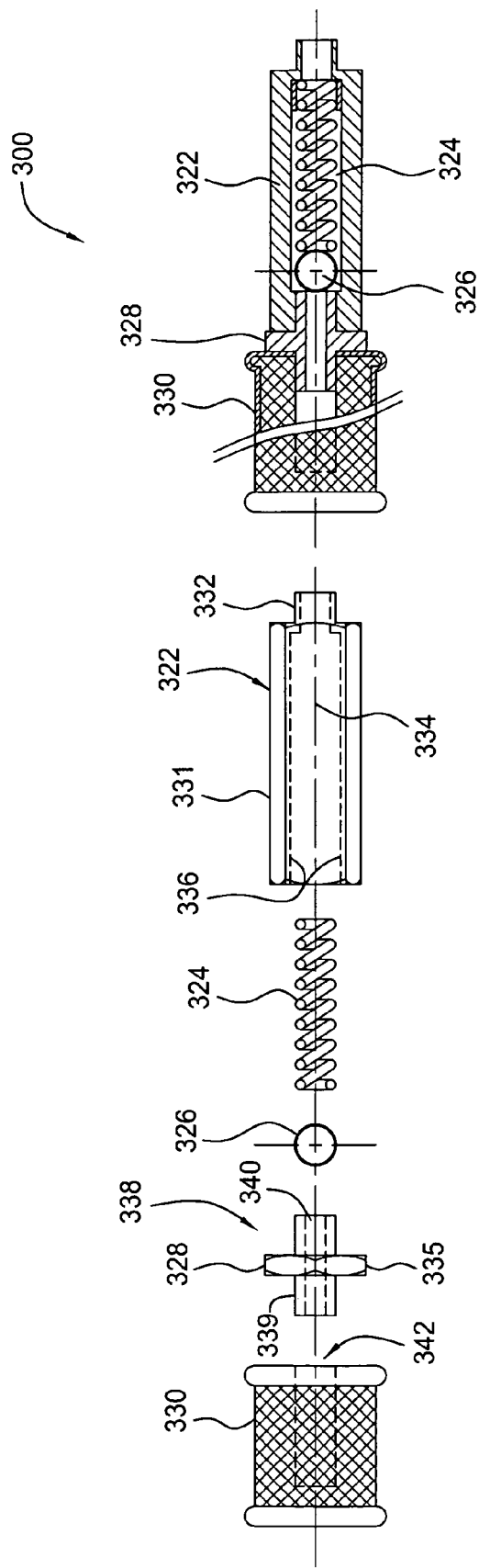
FIG. 3 illustrates an auxiliary valve assembly that is in accord with the principles of the present invention and that is used in the internal combustion engine of FIG. 2.

FIG. 3 illustrates the auxiliary valve assembly 300 in more detail. The auxiliary valve assembly 300 is comprised of a valve chamber 322, a spring 324, a ball 326, a coupler 328, and an air filter 330.

The valve chamber 322 includes a housing 331 having a threaded engine attachment element 332 for threading into a mating female opening of the gas-air intake chamber 202. While FIG. 3 shows a threaded attachment element, some embodiments of the present invention will use a press-fitted member without threads. The threaded engine attachment element 332 enables quick mounting of the auxiliary valve assembly 300 to the internal combustion engine 200. The valve chamber housing 331 also includes a formed aperture 334 that extends through the valve chamber 322, including through the threaded engine attachment element 332. The aperture 334 is dimensioned to receive the spring 324 and the ball 326, and has inner threads 336 at an end of the aperture 334.

The coupler 328 includes a body 335 having both a first outer threaded member 338 that threads into the inner threads 336 of the valve chamber 322 and a second member 339. The body 335 also includes an aperture 340 that extends through the length of the coupler 328. The end of the first outer threaded member 338 mates to the ball 326, which is biased against the first outer threaded member 338 by the spring 324.

The spring 324 acts as a controlled bias element that forces the ball 326 to seal the aperture 340 until sufficient vacuum pressure is exerted through the formed aperture 334. At such time the spring 324 becomes more compressed, allowing the ball 326 to open the aperture 340 to allow air to pass through the valve chamber 322 and into the gas-air intake chamber 202. The length and the spring constant of the spring 324 provide the auxiliary valve assembly 320 with a controllable opening point.

The air filter 330 includes an opening 342 that is used to mount the air filter 330 on the second member 339. The opening 342 and the second member 339 can be threaded to enable attachment, or a pressure fit can be used. Other methods of attaching the air filter 330 on the second member 339 can also be used including soldering, welding, gluing, the use of compression ring, etc.

While the foregoing is directed to embodiments of the present invention, other and further embodiments of the invention may be devised without departing from the basic scope thereof, and the scope thereof is determined by the claims that follow.

The invention claimed is:

1. A valve assembly comprising:
   a valve chamber having a housing with a valve chamber aperture that extends through said valve chamber, said valve chamber further including an engine attachment element for attaching said valve assembly to an engine;
   a coupler having a body with a first coupler member, a second coupler member, and a coupler aperture that extends through said coupler, said coupler being attached to said valve chamber such that said first coupler member mates with said valve chamber aperture such that said coupler aperture and said valve chamber aperture form a continuous air path;
   a ball within said valve chamber aperture; and
   a bias element within said valve chamber aperture that biases said ball toward said first coupler member such that said ball seals said coupler aperture by pressing against said first coupler member;
   where in a vacuum asserted through said valve chamber aperture causes said ball to move away from said first coupler member.

2. The valve assembly of claim 1, further including an air filter attached to the second member of said coupler, said air filter for filtering air that passes through said coupler aperture.

3. the valve assembly of claim 2, wherein said air filter includes and opening to received the second member of said coupler.

4. the valve assembly of claim 1, wherein said engine attachment element is a, threaded member.

5. the valve assembly of claim 1, wherein said ball moves away from said first coupler member at a predetermined vacuum.

6. the valve assembly of claim 5, wherein said predetermined vacuum depends on said bias element.

7. the valve assembly of claim 1, wherein said bias element is a spring.

8. an internal combustion engine comprising:
   A gas-air intake chamber; and
   A valve assembly attached to said gas-air intake chamber, said valve assembly including:
   a valve chamber having a housing with a valve chamber aperture that extends through said valve chamber, said valve chamber further including an engine attachment element for attaching said valve assembly to said gasair intake chamber;
   a coupler having a body with a first coupler member, a second coupler member, and a coupler aperture that extends through said coupler, said coupler being attached to said valve chamber such that said first coupler member mates with said valve chamber aperture such that said coupler aperture and said valve chamber aperture form a continuous air path;
   a ball within said valve chamber aperture; and
   a bias element within said valve chamber aperture that biases said ball toward said first coupler member such that said ball seals said coupler aperture by pressing against said first coupler member;
   Where in a vacuum asserted through said valve chamber aperture causes said ball to move away from said first coupler member and such that air is drawn through said valve assembly into said gas-air intake chamber.

9. The internal combustion engine of claim 8, further including an air filter attached to the second member of said coupler, said air filter for filtering air that passes through said coupler aperture.

10. The internal combustion engine of claim 9, wherein said air filter includes and opening to received the second member of said coupler.

11. The internal combustion engine of claim 8, wherein said engine attachment element is a threaded member.

12. The internal combustion engine of claim 8, wherein said ball moves away from said first coupler member at a predetermined vacuum.

13. The internal combustion engine of claim 12, wherein said predetermined vacuum depends on said bias element.

14. The valve assembly of claim 8, wherein said bias element is a spring.

15. A motorized vehicle comprising:
    an internal combustion engine having a gas-air intake chamber; and
    A valve assembly attached to said gasair intake chamber, said valve assembly including:
    a valve chamber having a housing with a valve chamber aperture that extends through said valve chamber, said valve chamber further including an engine attachment element for attaching said valve assembly to said gas-air intake chamber;
    a coupler having a body with a first coupler member, a second coupler member, and a coupler aperture that extends through said coupler, said coupler being attached to said valve chamber such that said first coupler member mates with said valve chamber aperture such that said coupler aperture and said valve chamber aperture form a continuous air path;
    a ball within said valve chamber aperture; and
    a bias element within said valve chamber aperture that biases said ball toward said first coupler member such that said ball seals said coupler aperture by pressing against said first coupler member; wherein a vacuum asserted through said valve chamber aperture causes said ball to move away from said first coupler member and such that air is drawn through said valve assembly into said gasair intake chamber.

16. The motorized vehicle of claim 15, further including an air filter attached to the second member of said coupler, said air filter for filtering air that passes into said gasair intake chamber.

17. The motorized vehicle of claim 16, wherein said air filter includes and opening to received the second member of said coupler.

18. The motorized vehicle of claim 15, wherein said ball moves away from said first coupler member at a predetermined vacuum.

19. The motorized vehicle of claim 18, wherein said predetermined vacuum depends on said bias element.

20. The motorized vehicle of claim 15, wherein said bias element is a spring.

* * * * *